United States Patent
Melecio Ramirez et al.

(10) Patent No.: US 12,451,308 B2
(45) Date of Patent: Oct. 21, 2025

(54) CIRCUIT BREAKER SYSTEMS

(71) Applicant: Schneider Electric USA, Inc., Andover, MA (US)

(72) Inventors: Juan Ignacio Melecio Ramirez, North Liberty, IA (US); Skylar Frances Wetzel, Cedar Rapids, IA (US); Jeremy D. Schroeder, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 262 days.

(21) Appl. No.: 18/125,422

(22) Filed: Mar. 23, 2023

(65) Prior Publication Data

US 2024/0222047 A1 Jul. 4, 2024

Related U.S. Application Data (60) Provisional application No. 63/436,439, filed on Dec. 30, 2022.

(51) Int. Cl.
| | | |
|---|---|---|
| *H01H 15/10* | (2006.01) | |
| *G01D 5/20* | (2006.01) | |
| *H01F 17/00* | (2006.01) | |

(52) U.S. Cl.
CPC .............. *H01H 15/10* (2013.01); *G01D 5/20* (2013.01); *H01F 17/0006* (2013.01)

(58) Field of Classification Search
CPC ............. H01H 15/10; H01H 2071/048; H01H 15/025; G01D 5/20; H01F 17/0006
USPC ........................................................ 361/115
See application file for complete search history.

(56) References Cited

U.S. PATENT DOCUMENTS

| | | | |
|---|---|---|---|
| 6,043,644 A * | 3/2000 | de Coulon | G01D 5/2208 324/164 |
| 2012/0187089 A1 | 7/2012 | Chen et al. | |
| 2013/0043111 A1* | 2/2013 | Venkitachalam | H01H 71/04 200/329 |
| 2015/0153414 A1* | 6/2015 | Mills | G01R 31/327 324/424 |
| 2016/0133415 A1 | 5/2016 | Bock et al. | |
| 2017/0098520 A1* | 4/2017 | Mittelstadt | G01D 5/145 |

(Continued)

FOREIGN PATENT DOCUMENTS

| | | |
|---|---|---|
| CN | 201282091 Y | 7/2009 |
| EP | 3863172 A1 | 8/2021 |

(Continued)

OTHER PUBLICATIONS

International Search Report and the Written Opinion for corresponding International Patent Application No. PCT/US2023/84536 dated Apr. 25, 2024, 14 pages.

*Primary Examiner* — Sreeya Sreevatsa
(74) *Attorney, Agent, or Firm* — Troutman Pepper Locke LLP (57) ABSTRACT

A circuit breaker assembly can include a mechanism configured to be actuated by an operator toward a first position. The mechanism can be configured to move between the first position and a second position to change a state of a contactor between a closed state and an open state. The assembly can include a position sensor system configured to sense a position of the mechanism between the first position and the second position.

21 Claims, 7 Drawing Sheets

(56) References Cited

U.S. PATENT DOCUMENTS

2019/0148093 A1* 5/2019 Reuber ................ H01H 71/10
                                                        335/189
2021/0305727 A1   9/2021 Delbaere et al.

FOREIGN PATENT DOCUMENTS

FR         2940517 A1    6/2010
WO      2014032697 A1    3/2014

* cited by examiner

CIRCUIT BREAKER SYSTEMS

CROSS-REFERENCE TO RELATED APPLICATIONS

This application claims priority to and the benefit of U.S. Provisional Application No. 63/436,439, filed Dec. 30, 2022, the entire contents of which are herein incorporated by reference in their entirety.

FIELD

This disclosure relates to circuit breaker systems.

BACKGROUND

Certain remotely operated (e.g., motorized) circuit breaker control designs use an ON/OFF switch that notify the microcontroller when a mechanism (e.g., a slider) moves in or out of a microswitch reach activation zone. Such systems prevent the microcontroller from knowing the true position of the mechanism, or if there is a no-mechanism-movement-condition where there is a locked, or open/damaged operator (e.g., a motor).

Such conventional methods and systems have generally been considered satisfactory for their intended purpose. However, there is still a need in the art for improved circuit breaker systems. The present disclosure provides a solution for this need.

SUMMARY

A circuit breaker assembly can include a mechanism (e.g., a slider) configured to be actuated by an operator (e.g., a motor) toward a first position. The mechanism can be configured to move between the first position and a second position to change a state of a contactor between a closed state and an open state. The assembly can include a position sensor system configured to sense a position of the mechanism between the first position and the second position.

In certain embodiments the position sensor system can include a magnetic effect material disposed on, within, or forming a portion of the mechanism. The position sensor system can also include a sense inductor disposed in magnetic communication with the magnetic effect material. The mechanism can be configured to move relative to the sense inductor. The sense inductor can be configured to sense a magnetic field flux associated with the magnetic effect material and output a sense signal. The position sensor system can also include a position module operatively connected to the sense inductor and configured to determine a position of the mechanism based on the sense signal.

In certain embodiments, the assembly can include a filter disposed between the sense inductor and the position module. The filter can be configured to filter and/or amplify the sense signal from the sense inductor.

In certain embodiments, the magnetic effect material can be a permanent magnet. In such embodiments, the sense inductor can be configured to output a sense signal when the permanent magnet is in motion, for example (e.g., the changing magnetic field induces a current in the sense inductor). In certain embodiments, the sense inductor can be a planar coil. For example, the sense inductor can be disposed on or within a printed circuit board (PCB) of the circuit breaker assembly in a position that corresponds to a proximity of the permanent magnet on the mechanism.

In certain embodiments, the magnetic effect material can be a magnetic coupler (e.g., a ferromagnetic material). In such embodiments, the position sensor system can further include a primary inductor operatively connected to the position module to receive an input signal and configured to generate a reference magnetic field. A relative position of the magnetic coupler can affect the reference magnetic field to effect the magnetic field flux sensed by the sense inductor.

In certain embodiments, the input signal can be a changing signal (e.g., a square wave, a smooth wave) such that the reference magnetic field is not constant. For example, the sense inductor can be configured to output the sense signal whether the mechanism is in motion or stationary. Further, in such embodiments, the position module can be configured to determine a position of the mechanism whether the mechanism is in motion or stationary based on the sense signal.

In certain embodiments, the sense inductor and the primary inductor can be planar coils. In certain embodiments, the planar coils can be coplanar (e.g., on a single PCB layer). In other embodiments, the planar coils can be on different copper layers of the PCB. In certain embodiments, the assembly can include the operator and a control module configured to control the operator. In certain embodiments, the control module can include the position module (e.g., hosted on the same PCB). In certain embodiments, the control module can be configured to correlate an operator control command with a position of the mechanism to determine a health of the operator and/or mechanism.

In accordance with at least one aspect of this disclosure, a circuit breaker assembly can include an operator and a mechanism, e.g., as disclosed herein, configured to be actuated by the operator toward a first position and configured to move between the first position and a second position to change a state of a contactor between a closed state and an open state. The assembly can include a permanent magnet disposed on, within, or forming a portion of the mechanism. The assembly can include a sense inductor disposed to be in magnetic communication with the permanent magnet. The permanent magnet can be configured to move relative to the sense inductor. The sense inductor can be configured to sense a magnetic field flux associated with motion of the permanent magnet to output a sense signal. The assembly can include a position module operatively connected to the sense inductor and configured to determine a position of the mechanism in motion based on the sense signal. The assembly can be any other suitable assembly as disclosed herein, and/or can include any other suitable portions of any other suitable assembly disclosed herein.

In accordance with at least one aspect of this disclosure, a circuit breaker assembly can include an operator and a mechanism, e.g., as disclosed herein, configured to be actuated by the operator toward a first position and configured to move between the first position and a second position to change a state of a contactor between a closed state and an open state. The assembly can include a magnetic coupler disposed on, within, or forming a portion of the mechanism. The assembly can include a primary inductor (e.g., as described above) disposed in magnetic proximity to the magnetic coupler. The primary inductor can be configured to receive an input signal and configured to generate a reference magnetic field. The assembly can include a sense inductor (e.g., as described above) disposed to be in magnetic communication with the magnetic coupler and/or the primary inductor. The mechanism can be configured to move the magnetic coupler relative to the sense inductor and the primary inductor. The sense inductor can be configured to sense a magnetic field flux associated with a position and/or motion of the magnetic coupler to output a sense signal. A relative position of the magnetic coupler can affect the reference magnetic field to affect the magnetic field flux sensed by the sense inductor. The assembly can also include a position module (e.g., as disclosed above) operatively connected to the primary inductor to provide the input signal to the primary inductor. The position module can also be connected to the sense inductor and configured to determine a position of the mechanism based on the sense signal. The assembly can be any other suitable assembly as disclosed herein, and/or can include any other suitable portions of any other suitable assembly disclosed herein.

In accordance with at least one aspect of this disclosure, a non-transitory computer readable medium can include computer executable instructions configured to cause a computer to perform a method. The method can include receiving a sense signal from a sense inductor positioned relative to a mechanism of a remotely operated (e.g., motorized) circuit breaker to be in magnetic communication with a portion of the mechanism which moves relative to the sense inductor, and determining a position of the mechanism based on the sense signal.

In certain embodiments, determining the position of the mechanism can include correlating a peak voltage amplitude of the sense signal to a relative position of the mechanism based a known magnetic field relationship between the mechanism and the sense inductor. In certain embodiments, the method can include inputting an input signal to a primary inductor to create a reference magnetic field. In certain embodiments, determining the position of the mechanism includes comparing the sense signal to the input signal to determine a change of the reference magnetic field as a result of the position of the mechanism, and correlating a change of the reference magnetic field to a position of the mechanism.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
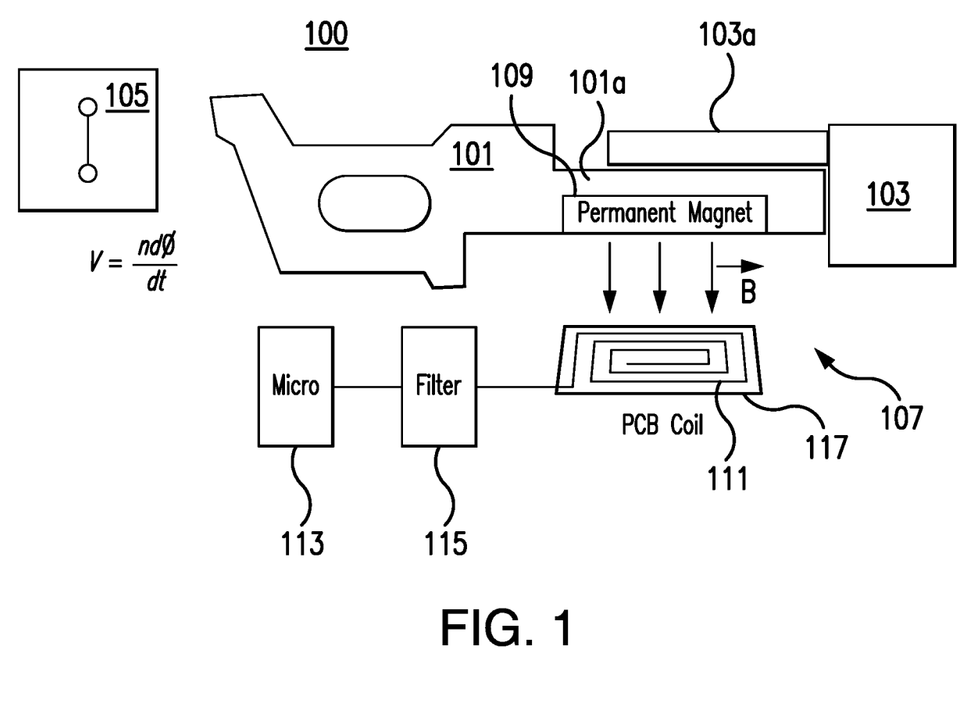
FIG. 1 is a schematic diagram of an embodiment of an assembly in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2A-5. Certain embodiments described herein can be used to provide position and/or health information of components of remotely operated circuit breakers, for example.

Figure 2A:
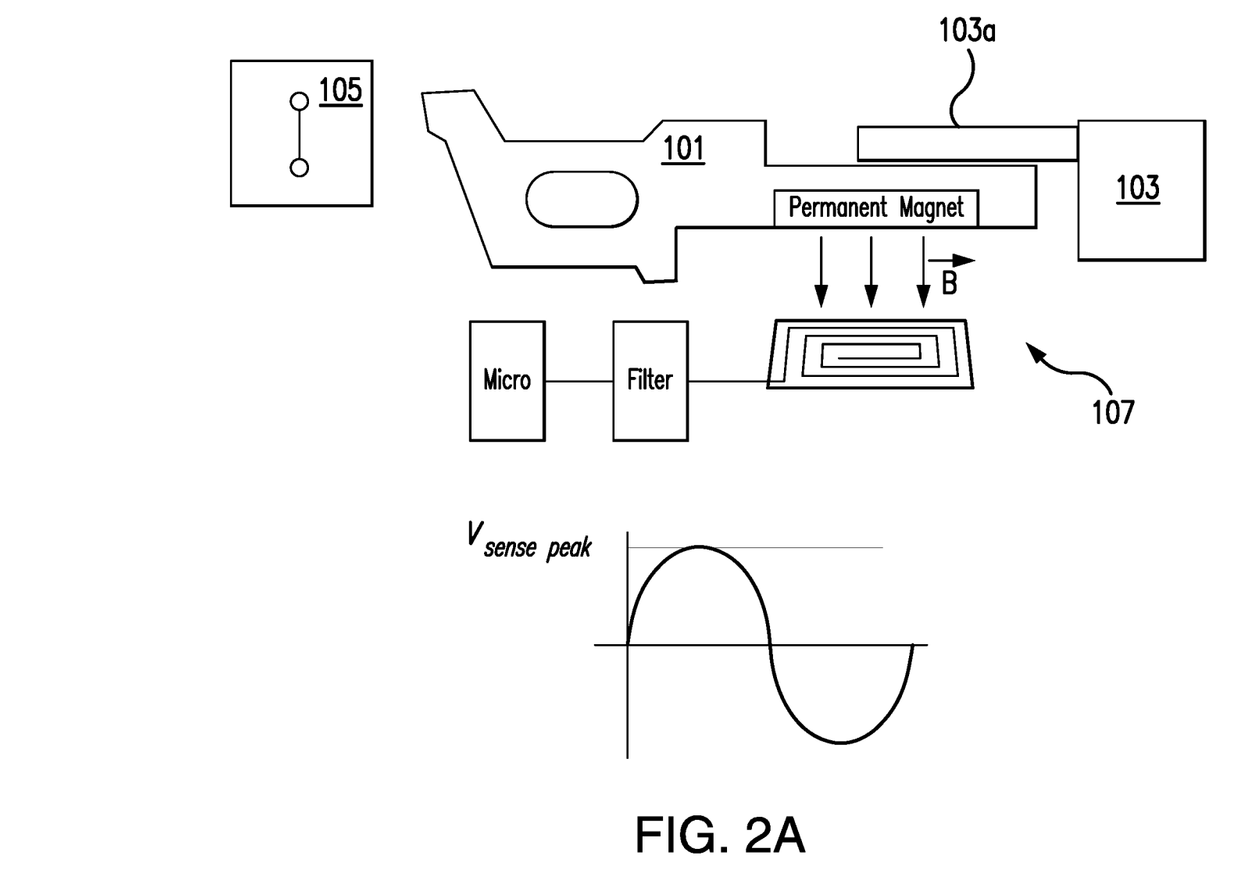
FIG. 2A is a schematic diagram of the assembly of FIG. 1, shown moving from a first position toward a second position, showing an associated voltage response.
Figure 2B:
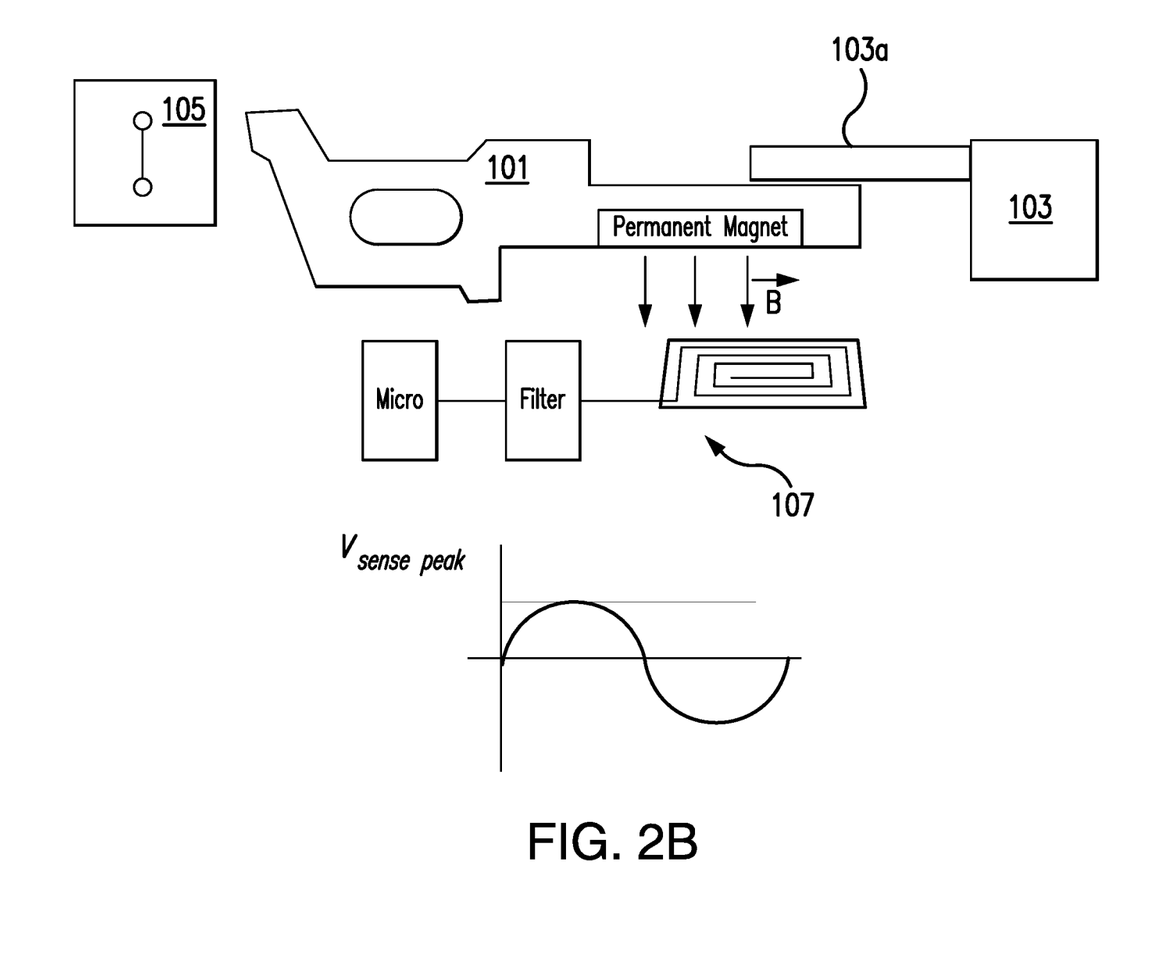
FIG. 2B is a schematic diagram of the assembly of FIG. 2A, shown moving further toward the second position, showing the associated voltage response.
Figure 2C:
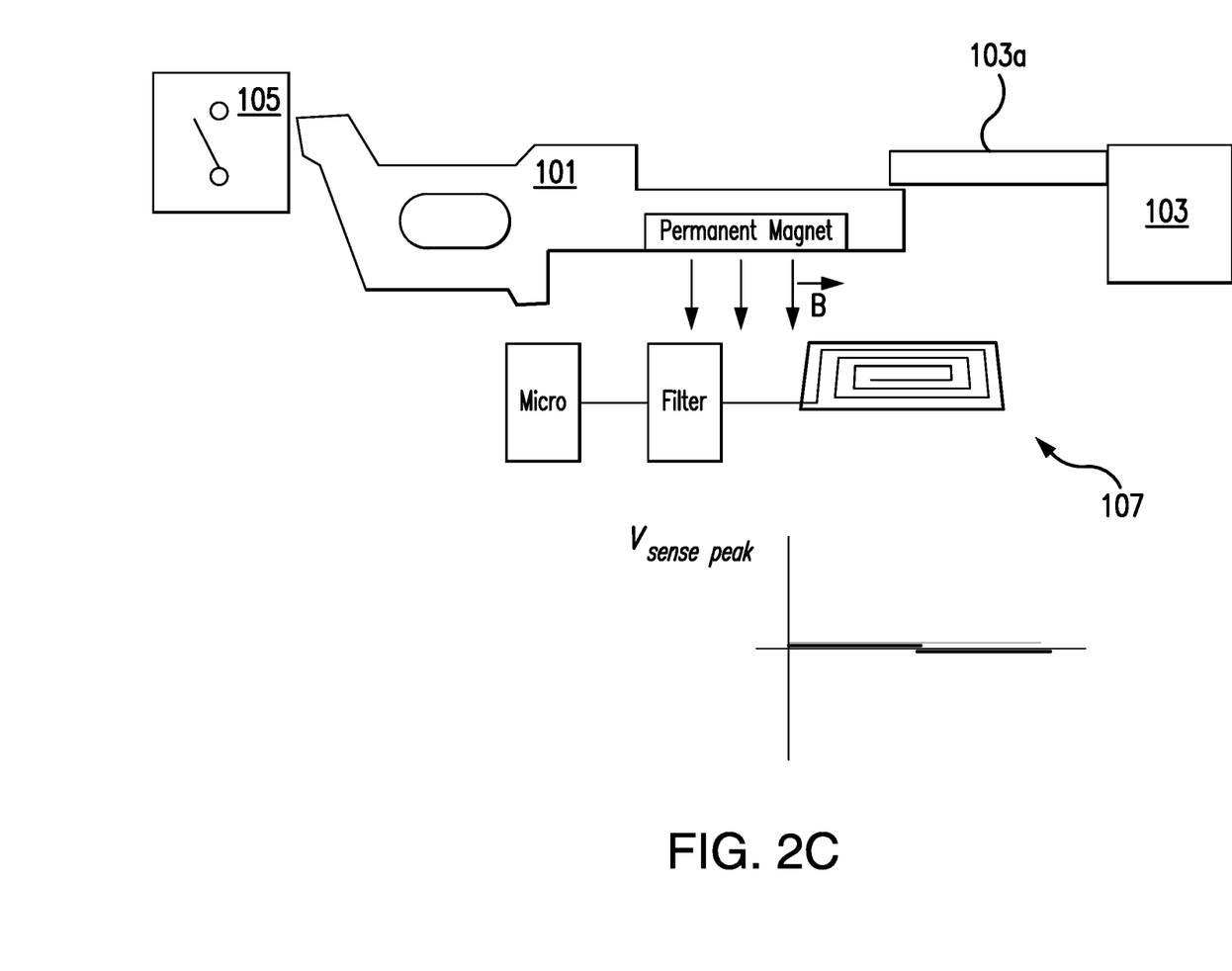
FIG. 2C is a schematic diagram of the assembly of FIG. 2B, shown moving further toward the second position, showing the associated voltage response.

Referring to FIGS. 1 and FIGS. 2A-2C, a circuit breaker assembly 100 can include a mechanism 101 (e.g., a slider as shown) configured to be actuated by an operator 103 (e.g., a motor) toward a first position (e.g., as shown in FIG. 2A). The mechanism 101 can be configured to move between the first position and a second position (e.g., as shown in FIG. 2C) to change a state of a contactor 105 (e.g., directly or indirectly via any suitable mechanical connection) between a closed state (e.g., as shown in FIGS. 1 and 2A) and an open state (e.g., as shown in FIG. 2C). The mechanism 101 can have any suitable shape (e.g., as shown), and can be configured to contact any suitable levers and/or linkages to change the state of the contactor 105. In certain embodiments, the mechanism 101 is configured to allow a bi-stable or tri-stable contactor state, for example. Any suitable mechanism shape or configuration to allow for any suitable number of stable states is contemplated herein. For example, in the second position, the mechanism 101 can be configured to contact one or more levers and/or other linkages to ultimately result in the contactor 105 opening. In certain embodiments, when moved toward the first position, the mechanism 101 can be configured to contact one or more levers and/or other linkages to ultimately result in the contactor 105 closing.

The mechanism 101 can be mechanically connected to the operator 103 in any suitable manner (e.g., a rack 101a on the mechanism 101 meshed with a worm gear 103a attached to the operator 103) such that the operator 103 can actuate the mechanism 103 in at least one direction (e.g., toward the first position). In certain embodiments, the operator 103 and/or mechanical connection to the mechanism 101 can be configured to release the mechanism 101 to allow the mechanism 101 to travel to the second position, e.g., to open the contactor and shut off the circuit breaker. For example, the worm gear 103a can include a channel (not shown) configured to allow the rack 101a of the mechanism 101 to release from teeth of the worm gear 103a when the worm gear 103a rotates sufficiently. The worm gear 103a can be configured such that the mechanism 101 reaches the first position just before the channel is rotated into position such that the worm gear 103a can be rotated slight more (e.g., which may pull the mechanism 101 slightly more toward the operator 103) to then cause release of the rack 101a. In certain embodiments, the mechanism 101 can be biased toward the second position with a biasing member (e.g., a spring) to cause snap motion to the second position when released by the operator 103 and/or mechanical connection. In certain embodiments, other suitable mechanism 101 assemblies can be utilized.

The assembly 100 can include a position sensor system 107 configured to sense a position of the mechanism 101 between the first position and the second position. In certain embodiments, the position sensor system 107 does not include a limiter switch that mechanically indicates when the mechanism 101 is in the first position (and/or another switch for the second position). In certain embodiments, the position sensor system 107 is strictly electro-magnetic without any other mechanical components.

In certain embodiments the position sensor system 107 can include a magnetic effect material 109 (also magnetic effect material 409 shown in FIG. 4) disposed on, within, or forming a portion of the mechanism 101 (e.g., as shown disposed on a portion of the rack 101a). The magnetic effect material 109 can be disposed on the side of portion of the mechanism 101, for example (e.g., to face a circuit board). Any suitable position for the magnetic effect material 109 to function as described below is contemplated herein such that the PM magnetic flux lines cross the PCB coils. For example, the PM flux lines cross the PCB coils perpendicularly (e.g., which can produce the strongest response), however any suitable angle to produce a suitable response is contemplated herein.

The position sensor system 107 can also include a sense inductor 111 disposed in magnetic communication with the magnetic effect material 109. The mechanism 101 can be configured to move relative to the sense inductor 111 (e.g., the sense inductor 111 can be fixed relative to a circuit breaker housing). The sense inductor 111 can be configured to sense a magnetic field flux associated with the magnetic effect material 109 and output a sense signal. The position sensor system 107 can also include a position module 113 operatively connected to the sense inductor 111 and configured to determine a position of the mechanism 101 based on the sense signal.

In certain embodiments, the assembly can include a filter 115 disposed between the sense inductor 111 and the position module 113. The filter 115 can be configured to filter and/or amplify the sense signal from the sense inductor 111, for example. Any other suitable electronics for signal processing are contemplated herein.

Figure 3:
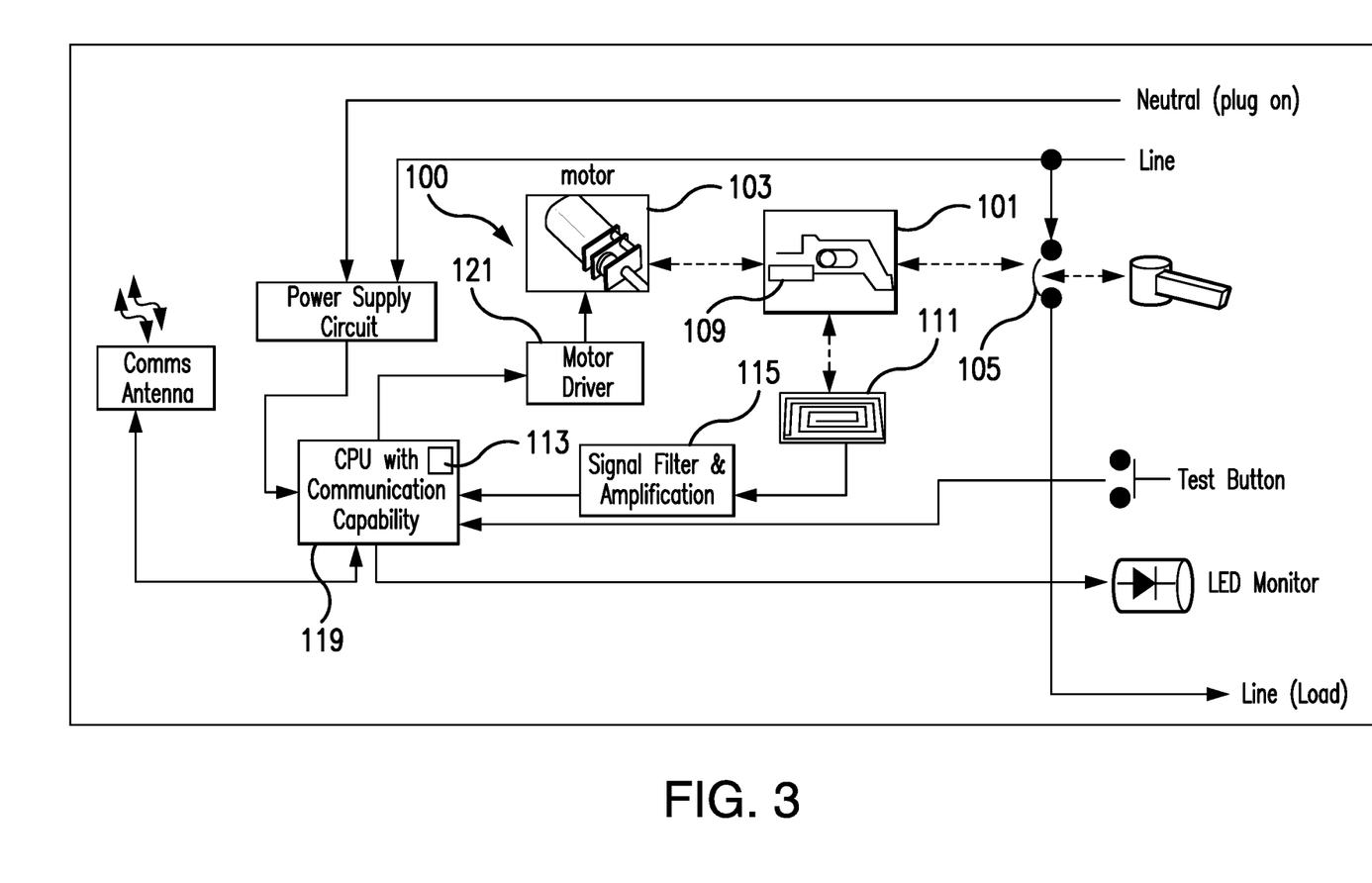
FIG. 3 is a schematic of an embodiment of remotely operated circuit breaker assembly comprising the assembly of FIG. 1.

In certain embodiments, e.g., as shown in FIGS. 1-3, the magnetic effect material 109 can be a permanent magnet. In such embodiments, the sense inductor 111 can be configured to output a sense signal when the permanent magnet is in motion, for example (e.g., the changing magnetic field induces a current in the sense inductor 111). In certain embodiments, the sense inductor 111 can be a planar coil (e.g., as shown). For example, the sense inductor 111 can be disposed on or within a printed circuit board (PCB) 117 of the circuit breaker assembly 100 in a position that corresponds to a proximity of the permanent magnet on the mechanism 101. For example, the sense inductor 111 can be a coil formed by the PCB 117.

In such embodiments as shown in FIGS. 1-3, the position sensor system 107 can be passive and does not require power or input. However, with only a permanent magnet, relative motion between the sense inductor 111 and the mechanism 101 is required to produce a sense signal. As shown in FIGS. 2A-2C, the signal can be a sinusoid of changing amplitude. Any other suitable time varying signal is contemplated herein. The amplitude can be correlated to a position of the mechanism 101, for example. Any other suitable signal type (e.g., any suitable time varying signal) and/or signal features can be used to determine any suitable characteristic of the mechanism 101 (e.g., speed, position, etc.).

In certain embodiments, as shown in FIG. 3, the assembly 100 can include the operator 103 and a control module 119 configured to control the operator 103 (e.g., via an operator driver 121). In certain embodiments, the control module 119 can include the position module 113 (e.g., hosted on the same PCB and/or software). In certain embodiments, the control module 119 can be configured to correlate an operator control command (e.g., from the control module 119) with a position of the mechanism 101 to determine a health of the operator 103 and/or mechanism 101. For example, the control module 119 can know if the operator 103 was to release the mechanism 101, and see if the mechanism 101 ever released. The control module 119 can determine how quickly, if at all, the operator 103 is able to pull the mechanism 101 to the first position, for example, and judge a health of the operator 103. Any other suitable correlations and diagnostic logic is contemplated herein. Embodiments can measure signal changes and determine one or more physical variables such as position, velocity and acceleration. For example, a rate of voltage change can be correlated to acceleration. Certain a priori information can be used compare data against to check the health of the system (e.g., high friction, operator operating properly, etc.) can be used for both directions. For example, of the device is open/damaged, a rate of change of voltage would change. If there is a locked operator, there would be zero voltage. In certain embodiments, health information can be communicated to the user automatically and/or at the command of the user, for example.

Embodiments as disclosed above can include a reduced power solution to obtain the real time mechanism position while mechanism is in motion. Embodiments can include an unpowered, single PCB assembly coil sensor. Embodiments can include a simple hardware architecture solution that includes a PCBA coil over the main board and a permanent magnet (PM) in the mechanical mechanism. A PM can provide a relative constant flux field, and can be secured to the mechanism for example, by adhesive bonging or a mechanical feature. The PM segment can be magnetized to be polarized such that the PM magnetic flux lines cross the PCB coils (e.g., perpendicularly or at another suitable angle). Embodiments can provide the greatest sensing voltage when the PCBA coil is directly over entire PM volume. Embodiments can be able to evaluate end of life conditions that include a locked motor, open/damaged motor or mechanical fatigue, for example. Embodiments can include complete motor control contact open and close precision with calibration. Embodiments can increase reliability with a touchless magnet feature and reduced parts (e.g., no limiter switches needed). Embodiments can provide easy assembly motor initialization, as well as real time monitoring of physical quantities, such as speed, acceleration, and position.

Figure 4:
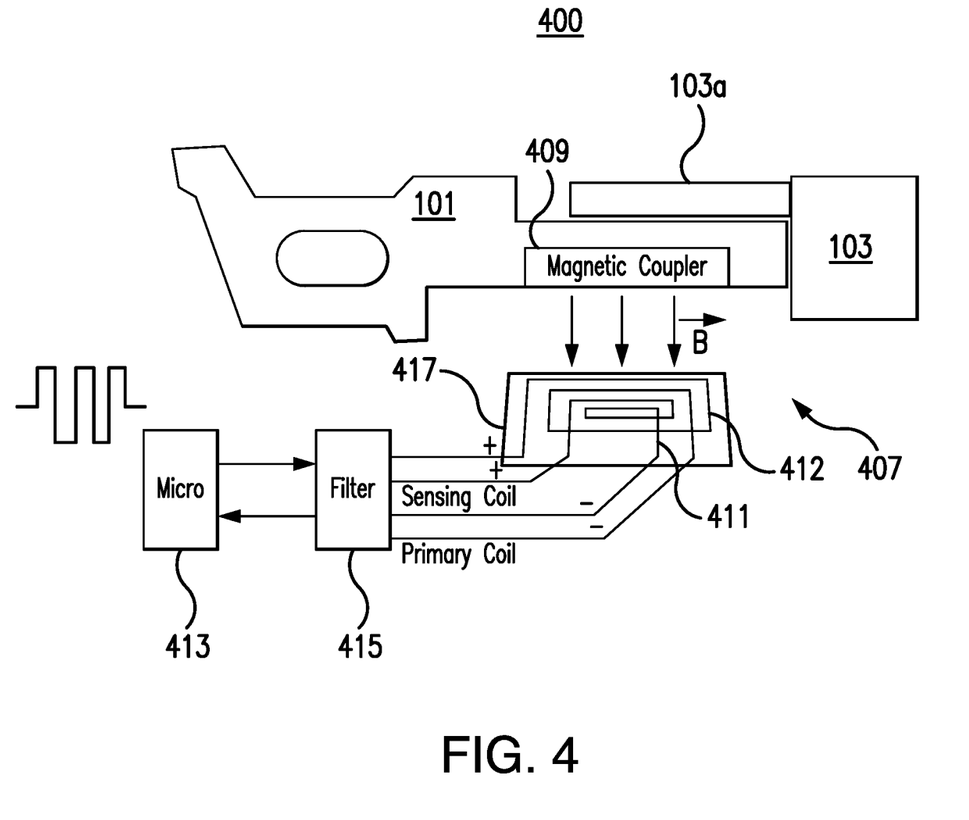
FIG. 4 is a schematic diagram of an embodiment of an assembly in accordance with this disclosure.
Figure 5:
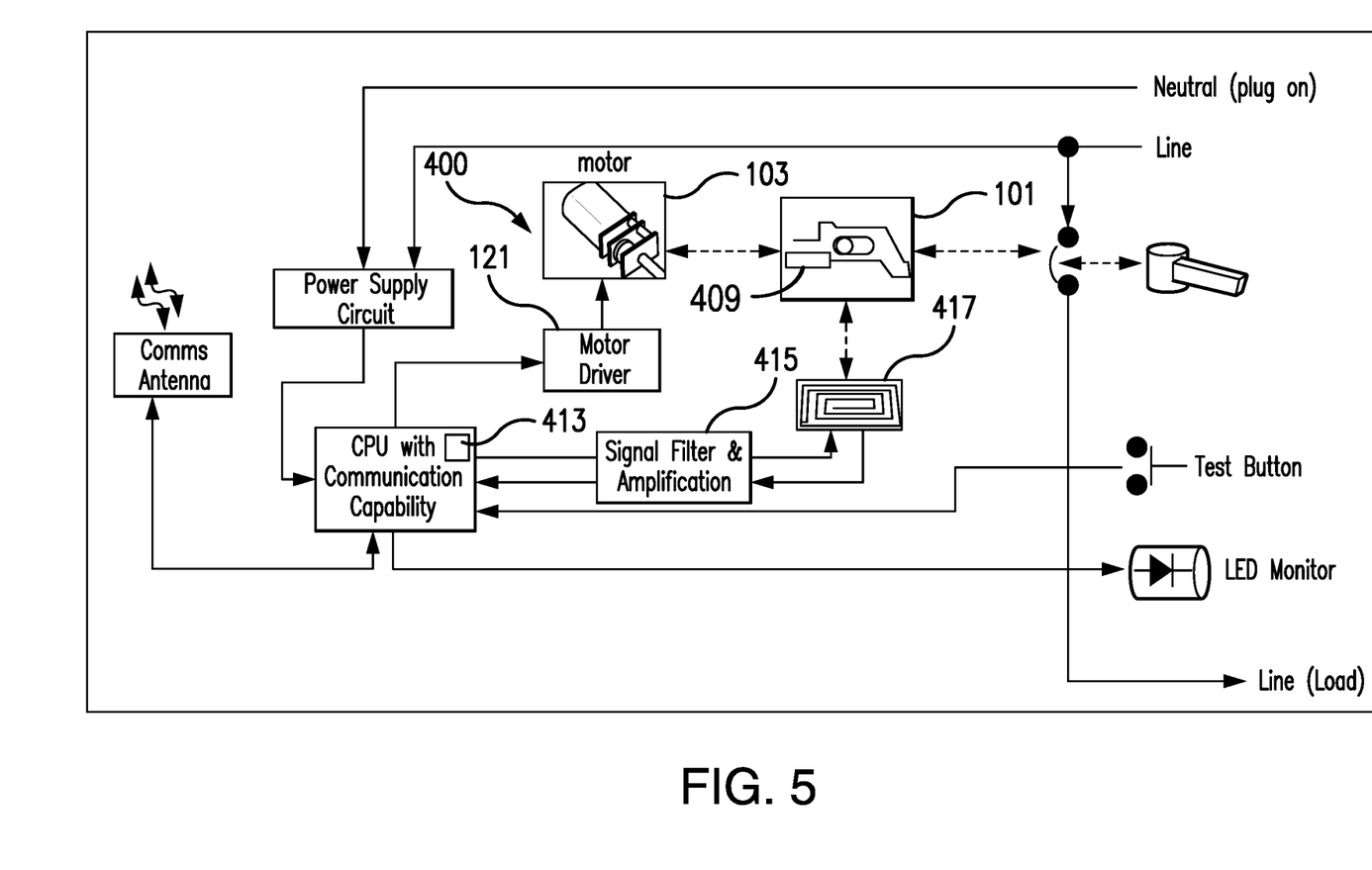
FIG. 5 is a schematic of an embodiment of remotely operated circuit breaker assembly comprising the assembly of FIG. 4.

Referring to FIGS. 4 and 5, in certain embodiments, the magnetic effect material 409 can be a magnetic coupler (e.g., a ferromagnetic material such as a ferrous material). In such embodiments, the position sensor system 407 can further include a primary inductor 412 operatively connected to the position module 413 (e.g., through a filter 415, e.g., for filtering and/or amplification in one or both directions) to receive an input signal from the position module 413 and configured to generate a reference magnetic field. A relative position of the magnetic coupler can affect the reference magnetic field to effect the magnetic field flux sensed by the sense inductor 411.

In certain embodiments, the input signal from the position module 413 can be a changing signal (e.g., a square wave, a smooth wave) such that the reference magnetic field is not constant. For example, the sense inductor 411 can be configured to output the sense signal whether the mechanism 101 is in motion or stationary. Further, in such embodiments, the position module 413 can be configured to determine a position of the mechanism 101 whether the mechanism 101 is in motion or stationary based on the sense signal (e.g., because the effect that magnetic effect material 409 has on the flux seen by the sense inductor 411 can be correlated to the position of the magnetic effect material 409 regardless of motion).

In certain embodiments, as shown in FIG. 4, the sense inductor 411 and the primary inductor 412 can be planar coils. In certain embodiments, the planar coils can be coplanar (e.g., on a PCB 417). In other embodiments, the planar coils can be on different copper layers of the PCB. As shown, the planar coils can be concentric or about concentric. Any other suitable relative arrangement such that the sense inductor 411 is exposed to the magnetic field output by the primary inductor 412 is contemplated herein. Any suitable input signal for generating any suitable reference magnetic field is contemplated herein. Any suitable signal shape for the input signal is contemplated herein.

In certain embodiments, e.g., as shown in FIG. 5, the assembly 400 can include the operator 103 and a control module 419 configured to control the operator 403 (e.g., via an operator driver 121). In certain embodiments, the control module 419 can include the position module 413 (e.g., hosted on the same PCB and/or software). In certain embodiments, the control module 419 can be configured to correlate an operator control command (e.g., from the control module 419) with a position of the mechanism 101 to determine a health of the operator 103 and/or mechanism 101. For example, the control module 419 can know if the operator 103 was to release the mechanism 101, and see if the mechanism 101 ever released. The control module 419 can determine how quickly, if at all, the operator 103 is able to pull the mechanism 101 to the first position, for example, and judge a health of the operator 103. The control module 419 can be configured to determine if the mechanism 101 is stuck in a position as it can sense the position of the mechanism 101 whether stationary or not. The control module 419 can be configured to determine if the mechanism 101 is in an expected position at any moment, or whether the mechanism is in the first position or the second position, for example. Any other suitable correlations and diagnostic logic is contemplated herein.

An assembly 400 as shown in FIGS. 4 and 5 can provide more information than certain other embodiments. However, additional hardware (e.g., coils, wires, surface area), as well as a power supply to generate an input signal can be required. The assembly 400 can include any suitable similar components to the embodiment of an assembly 100 of FIG. 1.

Embodiments can include a double PCBA coil sensor. Such embodiments can have a piece of ferromagnetic material (e.g., iron alloy) instead of a permanent magnet, for example. The separate coils can be arranged in any suitable way, and can be together as shown, or separated in any suitable way. The primary coil can output a magnetic field, and the sensing coil can receive the magnetic field and see flux. The quality of this received flux received by the sensing coil can be modified by the magnetic coupler location and/or shape thus changing the sense signal as a function of mechanism position.

Such embodiments can determine the position of the mechanism when stationary by using an alternating signal, e.g., a wave, to generate flux. Such embodiments can be used to obtain the real time mechanism position while mechanism is in motion or stationary.

Such embodiments can include a hardware architecture solution that includes two PCBA coils over a main circuit breaker board and a magnetic coupler in the mechanical mechanism. The primary coil can receive a high frequency square waveform from a microcontroller and the sensing coil can read back the change in voltage to the microcontroller. The greatest sensing voltage can be when the PCBA coil is directly over entire magnetic coupler volume. Embodiments can be able to evaluate end of life conditions that include a locked operator, open/damaged operator or mechanical fatigue for example. Such embodiments can provide complete operator control contact open and close precision with calibration. Such embodiments can increase reliability with a touchless magnet feature and reduced parts. Such embodiments can provide easy assembly operator initialization, and real time monitoring of physical quantities, such as speed, acceleration, and position, for example. Multi-coil embodiments may prove a cost reduction compared to certain single coil embodiment due to the permanent magnet cost, for example.

In accordance with at least one aspect of this disclosure, a circuit breaker assembly 100 can include an operator 103 and a mechanism 101, e.g., as disclosed herein. The assembly 100 can include a permanent magnet disposed on, within, or forming a portion of the mechanism. The assembly 100 can include a sense inductor 111 disposed to be in magnetic communication with the permanent magnet. The permanent magnet can be configured to move relative to the sense inductor 111. The sense inductor 111 can be configured to sense a magnetic field flux associated with motion of the permanent magnet to output a sense signal. The assembly 100 can include a position module 113 operatively connected to the sense inductor 111 and configured to determine a position of the mechanism 101 in motion based on the sense signal. The assembly 100 can be any other suitable assembly as disclosed herein, and/or can include any other suitable portions of any other suitable assembly disclosed herein.

In accordance with at least one aspect of this disclosure, a circuit breaker assembly 400 can include an operator 103 and a mechanism 101, e.g., as disclosed herein. The assembly 400 can include a magnetic coupler disposed on, within, or forming a portion of the mechanism 101. The assembly 400 can include a primary inductor 412 (e.g., as described above) disposed in magnetic proximity to the magnetic coupler. The primary inductor 412 can be configured to receive an input signal and configured to generate a reference magnetic field. The assembly 400 can include a sense inductor (e.g., as described above) disposed to be in magnetic communication with the magnetic coupler and/or the primary inductor 412. The mechanism 101 can be configured to move the magnetic coupler relative to the sense inductor 411 and the primary inductor 412. The sense inductor 411 can be configured to sense a magnetic field flux associated with a position and/or motion of the magnetic coupler to output a sense signal. A relative position of the magnetic coupler can affect the reference magnetic field to effect the magnetic field flux sensed by the sense inductor 411. The assembly 400 can also include a position module 413 (e.g., as disclosed above) operatively connected to the primary inductor 412 to provide the input signal to the primary inductor 412. The position module 413 can also be connected to the sense inductor 411 and can be configured to determine a position of the mechanism 101 based on the sense signal. The assembly 400 can be any other suitable assembly as disclosed herein, and/or can include any other suitable portions of any other suitable assembly disclosed herein.

In accordance with at least one aspect of this disclosure, a non-transitory computer readable medium can include computer executable instructions configured to cause a computer to perform a method. The method can include receiving a sense signal from a sense inductor 111, 411 positioned relative to a mechanism 101 of a remotely operated (e.g., motorized) circuit breaker to be in magnetic communication with a portion of the mechanism 101 which moves relative to the sense inductor 111, 411. The method can also include determining a position of the mechanism 101 based on the sense signal.

In certain embodiments, determining the position of the mechanism 101 can include correlating a peak voltage amplitude of the sense signal to a relative position of the mechanism 101 based a known magnetic field relationship between the mechanism 101 and the sense inductor 111. In certain embodiments, other suitable signal change characteristics can be correlated to a relative position of the mechanism 101 (e.g., frequency change, change of area under the curve, or any other identifiable signal change that can be correlated). In certain embodiments, the method can include inputting an input signal to a primary inductor 412 to create a reference magnetic field. In certain embodiments, determining the position of the mechanism 101 can include comparing the sense signal to the input signal to determine a change of the reference magnetic field as a result of the position of the mechanism 101, and correlating a change of the reference magnetic field to a position of the mechanism 101. The method can include any other suitable method(s) and/or portion(s) thereof.

Embodiments can be space efficient within a circuit breaker (e.g., a miniature circuit breaker). In embodiments, a size of the permanent magnet/ferromagnetic material and/or a number of turns/size of the coils can be configured to generate a suitable sense signal.

Certain embodiments provide solutions for different needs of electronic feedback with information of position, speed, status, and robustness using a contactless sensor, for example. Embodiments of a sensor can include two constructions, for example. The first can be a single coil with a permanent magnet. The second can be a primary coil powered with time variant signal (e.g., an alternating waveform) from a function controller, and a sensing coil and a magnetic coupler. Embodiments can be integrated into a circuit breaker. Embodiments can function to provide operator and mechanism position detection. Certain embodiments can provide a sensor system for breakers having an operator control mechanism to provide better feedback to the control system and delivering new advantageous health monitoring features, for example.

Existing designs use an ON/OFF switch that notifies the microcontroller when the mechanism moves in or out of the activation zone. Such systems prevent the microcontroller from knowing the true position of the mechanism, any "no operator movement condition" (locked, or open/damaged motor), or other health related information. Embodiments can include a coil sensor design configured to determine the continuous position of the mechanism as well as other health related conditions (e.g., open/damaged motor).

Embodiments can operate in a low voltage way to monitor a remote control feature. Embodiments can enable advance remote control circuit breakers with reduced power and components.

Embodiments can include any suitable computer hardware and/or software module(s) to perform any suitable function (e.g., as disclosed herein). For example, the control module and/or position module can include any suitable hardware and/or software module(s).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A circuit breaker assembly, comprising:
   a mechanism configured to be actuated by an operator toward a first position, wherein the mechanism is configured to move between the first position and a second position to change a state of a contactor between a closed state and an open state;
   a magnetic coupler disposed on, within, or forming a portion of the mechanism;
   a primary inductor disposed in magnetic proximity to the magnetic coupler, wherein the primary inductor is configured to receive an input signal and configured to generate a reference magnetic field;
   a sense inductor disposed to be in magnetic communication with the magnetic coupler and/or the primary inductor, wherein the mechanism is configured to move the magnetic coupler relative to the sense inductor and the primary inductor, and wherein the sense inductor is configured to sense a magnetic field flux, wherein a relative position of the magnetic coupler affects the reference magnetic field to effect the magnetic field flux sensed by the sense inductor, wherein the sense inductor and the primary inductor are planar coils that are concentric; and
   a position sensor system configured to sense a position of the mechanism between the first position and the second position.

2. The circuit breaker assembly of claim 1, further comprising a filter disposed between the sense inductor and the position module, and configured to filter and/or amplify the sense signal from the sense inductor.

3. The circuit breaker assembly of claim 1, wherein the magnetic coupler includes a permanent magnet, wherein the sense inductor is configured to output a sense signal when the permanent magnet is in motion.

4. The circuit breaker assembly of claim 3, wherein the sense inductor is disposed on or within a printed circuit board (PCB) of the circuit breaker assembly in a position that corresponds to a proximity of the permanent magnet on the mechanism.

5. The circuit breaker assembly of claim 1, wherein the primary inductor is operatively connected to a position module to receive the input signal.

6. The circuit breaker assembly of claim 5, wherein the input signal is a changing signal such that the reference magnetic field is not constant, wherein the sense inductor is configured to output a sense signal whether the mechanism is in motion or stationary, and wherein the position module is configured to determine a position of the mechanism whether the mechanism is in motion or stationary based on the sense signal.

7. The circuit breaker assembly of claim 6, wherein the sense inductor and the primary inductor are planar coils and are coplanar.

8. A circuit breaker assembly, comprising:
a mechanism configured to be actuated by an operator toward a first position, wherein the mechanism is configured to move between the first position and a second position to change a state of a contactor between a closed state and an open state;
a permanent magnet disposed on, within, or forming a portion of the mechanism;
a sense inductor disposed to be in magnetic communication with the permanent magnet, wherein the mechanism is configured to move relative to the sense inductor, and wherein the sense inductor is configured to sense a magnetic field flux associated with motion of the permanent magnet to output a sense signal; and
a position module operatively connected to the sense inductor and configured to determine a position of the mechanism in motion based on the sense signal.

9. The circuit breaker assembly of claim 8, further comprising the operator and a control module configured to control the operator.

10. The circuit breaker assembly of claim 8, further comprising a filter disposed between the sense inductor and the position module, and configured to filter and/or amplify the sense signal from the sense inductor.

11. The circuit breaker assembly of claim 8, wherein the sense inductor is a planar coil.

12. The circuit breaker assembly of claim 11, wherein the circuit breaker assembly includes a printed circuit board (PCB) comprising the position module.

13. The circuit breaker assembly of claim 12, wherein the sense inductor is disposed on or within the PCB in a position that corresponds to a proximity of the permanent magnet on the mechanism.

14. A circuit breaker assembly, comprising:
a mechanism configured to be actuated by an operator toward a first position, wherein the mechanism is configured to move between the first position and a second position to change a state of a contactor between a closed state and an open state;
a magnetic coupler disposed on, within, or forming a portion of the mechanism;
a primary inductor disposed in magnetic proximity to the magnetic coupler, wherein the primary inductor is configured to receive an input signal and configured to generate a reference magnetic field;
a sense inductor disposed to be in magnetic communication with the magnetic coupler and/or the primary inductor, wherein the mechanism is configured to move the magnetic coupler relative to the sense inductor and the primary inductor, and wherein the sense inductor is configured to sense a magnetic field flux associated with a position and/or motion of the magnetic coupler to output a sense signal, wherein a relative position of the magnetic coupler affects the reference magnetic field to effect the magnetic field flux sensed by the sense inductor, wherein the sense inductor and the primary inductor are planar coils that are concentric; and
a position module operatively connected to the primary inductor to provide the input signal to the primary inductor, wherein the position module is also connected to the sense inductor and configured to determine a position of the mechanism based on the sense signal.

15. The circuit breaker assembly of claim 14, further comprising the operator.

16. The circuit breaker assembly of claim 14, further comprising a filter disposed between the primary inductor and/or sense inductor and the position module, the filter configured to filter and/or amplify the sense signal from the sense inductor.

17. The circuit breaker assembly of claim 14, wherein the input signal is a changing signal such that the reference magnetic field is not constant, wherein the sense inductor is configured to output the sense signal whether the mechanism is in motion or stationary, and wherein the position module is configured to determine a position of the mechanism whether the mechanism is in motion or stationary based on the sense signal.

18. The circuit breaker assembly of claim 17, wherein the sense inductor and the primary inductor are planar coils and are coplanar.

19. A non-transitory computer readable medium, comprising computer executable instructions configured to cause a computer to perform a method, the method comprising:
inputting an input signal to a primary inductor to create a reference magnetic field, receiving a sense signal from a sense inductor positioned relative to a mechanism of a remotely operated circuit breaker to be in magnetic communication with a portion of the mechanism which moves relative to the sense inductor, wherein the sense inductor and the primary inductor are planar coils that are concentric; and
determining a position of the mechanism based on the sense signal.

20. The non-transitory computer readable medium of claim 19, wherein determining the position of the mechanism includes correlating a peak voltage amplitude of the sense signal to a relative position of the mechanism based on a known magnetic field relationship between the mechanism and the sense inductor.

21. The non-transitory computer readable medium of claim 19, wherein determining the position of the mechanism includes comparing the sense signal to the input signal to determine a change of the reference magnetic field as a result of the position of the mechanism, and correlating a change of the reference magnetic field to a position of the mechanism.

* * * * *